(12) United States Patent
Shahdad et al.

(10) Patent No.: US 6,665,291 B1
(45) Date of Patent: Dec. 16, 2003

(54) METHOD AND SYSTEM FOR CARRYING DATA, VOICE AND VIDEO ACROSS AN INTERNET PROTOCOL BASED WIRELESS TELECOMMUNICATIONS NETWORK

(75) Inventors: Yunis A. Shahdad, Richardson, TX (US); Ken Guttenfelder, Frisco, TX (US); George Yost, DeSoto, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/399,273

(22) Filed: Sep. 17, 1999

(51) Int. Cl.⁷ .............................................. H04L 12/66
(52) U.S. Cl. ..................... 370/352; 370/235; 370/236.2
(58) Field of Search .................................. 370/351, 352, 370/353, 354, 355, 356, 357, 360, 235, 236.2, 237, 248, 254

(56) References Cited

U.S. PATENT DOCUMENTS

| 6,161,008 A | * 12/2000 | Lee ............................. 455/414 |
| 6,222,829 B1 | * 4/2001 | Karlsson ...................... 370/329 |
| 6,459,682 B1 | * 10/2002 | Ellesson ...................... 370/235 |
| 6,473,413 B1 | * 10/2002 | Chiou ......................... 370/331 |

FOREIGN PATENT DOCUMENTS

| WO | WO 99/05830 | 4/1999 |
| WO | WO 99/31853 | 6/1999 |

OTHER PUBLICATIONS

Faccin S et al: "GPRS and IS–136 Integration for Flexible Network and Services Evolution" IEEE Personal Communications, vol. 6, No. 3, Jun. 1999 pp. 48–54.

* cited by examiner

*Primary Examiner*—Douglas Olms
*Assistant Examiner*—Ricardo M. Pizarro

(57) ABSTRACT

In a communications system comprising a public or other network (170), a wireless network (7), and an Internet Protocol based network (IP network) (100) configured as a transport mechanism between the public or other network (170) through a public network interface (160) and the wireless network (7) through a base station interface (140), a method of controlling signal traffic over multiple IP subnets, the method comprising the steps of gathering traffic data associated with the multiple IP subnets, and analyzing the traffic data to determine which of the multiple IP subnets provides the most appropriate connection for transmitting the data stream between the wireless network and the public or other network for achieving a desired amount of traffic distribution over the multiple IP subnets.

16 Claims, 3 Drawing Sheets

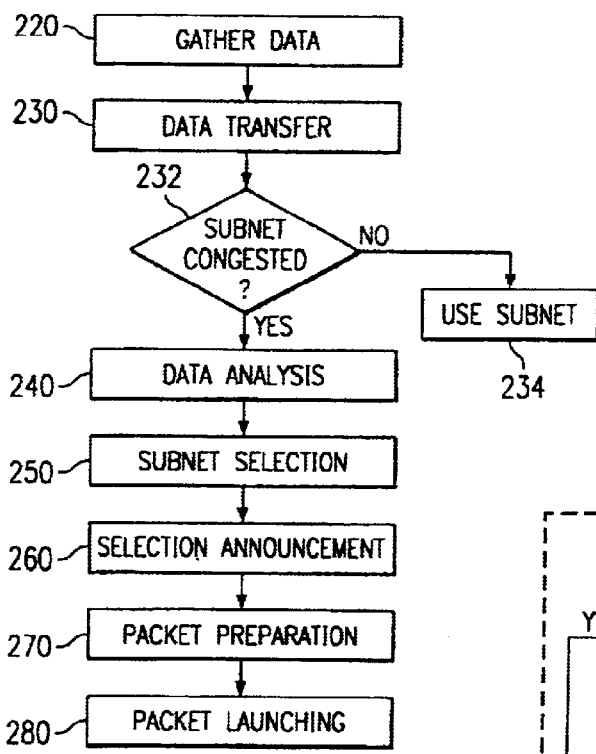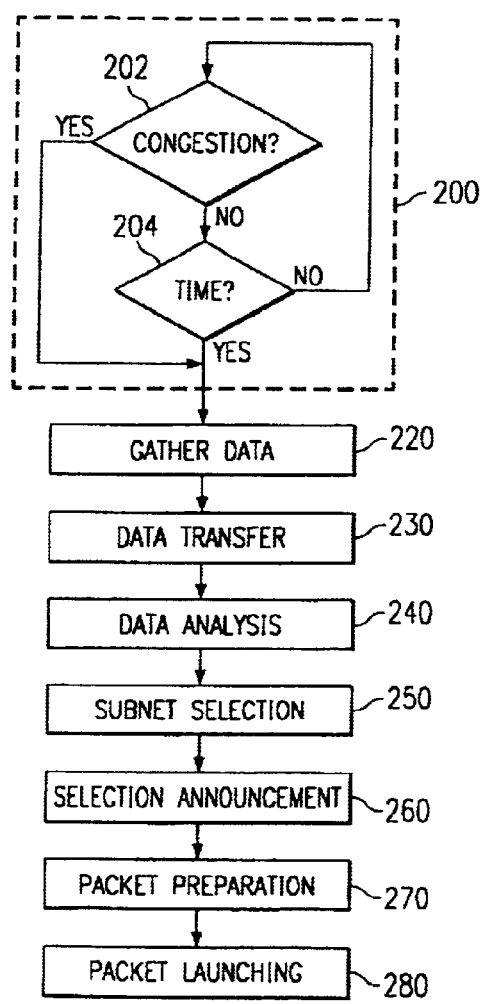

METHOD AND SYSTEM FOR CARRYING DATA, VOICE AND VIDEO ACROSS AN INTERNET PROTOCOL BASED WIRELESS TELECOMMUNICATIONS NETWORK

TECHNICAL FIELD

The present invention relates generally to Internet Protocol (IP) based telecommunications networks (IP networks) and, more specifically, to the redirection of traffic data between entry subnets of an IP network to arrive at an efficient signal path for carrying voice, data or video between a base station interface and any other network node using the IP network as the transport mechanism.

BACKGROUND OF THE INVENTION

As the use of wireless communications networks has grown, so have the number and types of services and features available to the Amobile@ or wireless user. Such services and features have placed additional demands on the network and its resources as well as the service providers which operate and maintain the network. For example, there were more than 50 million mobile phone subscribers in the U.S. alone at the end of 1997, and the number of mobile phone subscribers is growing at an estimated annual rate of about 50%. In addition, the growing number and availability of mobile station features (such as caller ID, call blocking, and mobile phone location services) place heavier processing burdens on the existing network infrastructure.

Service providers are finding it challenging to keep pace with these increasing network demands. Accordingly, as more subscribers simultaneously make calls and use more mobile station features, networks become congested. A result of network congestion is that calls to and from mobile stations sometimes do not go through, and existing calls risk disconnection.

To lower the probability of service disruptions, service providers are increasing network capacity. One way of increasing network capacity is by purchasing more network hardware from an existing vendor. However, new network hardware that is compatible with the existing network architecture may not be available, or may be prohibitively expensive. Furthermore, network hardware from a new vendor is often difficult to integrate with existing network hardware. To overcome the issues of cost, compatibility, and to provide for future network growth, service providers are utilizing Internet Protocol (IP) networks as the transport mechanism to provide additional capacity and to accommodate future network demands.

An IP-based network can provide a multi-purpose transport mechanism for all sorts of data types including voice, video or data (collectively called Atraffic@). Moreover, the widespread use of IP makes it an ideal platform for integration of other communication platforms such as, for example, the Public Switched Telephone Network (PSTN) or other network types. For example, a base station interface could be configured as the gateway or interface between other components of the wireless network and an IP network. Likewise, a public network interface could provide the interface mechanism between the IP network and data originating in the PSTN.

Furthermore, within the IP network, subnets function as exchange mechanisms, for example, between the base station interface node and the public network interface node. Traffic monitoring functions in the IP network are typically concentrated, in an Operations and Maintenance (O&M) function. Other functions, such as call placement, handshaking, connection supervision and monitoring are accomplished through a system control interface.

In operation, when a voice call is made from a mobile station in the wireless network, the call reaches a base station via radio waves and is routed to a gateway which acts as the interface between the base station interface and the IP network. Additionally, the gateway functions to format the call into data packets suitable for transport over that IP network. The call enters one of a plurality of subnets and is directed to other nodes leading to elements of the PSTN, or another base station interface node, for example.

An advantage of IP networks is that they provide widely understood, predefined standards for transporting information data types including voice and video data. IP is said to be an Aopen@ (meaning non-proprietary) standard. Furthermore, since IP networks are non-proprietary, then benefit from a large number of installed hardware platforms. For these reasons, IP networks are becoming a popular choice for expanding existing network computing resources.

IP networks send each packet individually across the network nodes with the IP packet re-assembled at a destination point. During times of heavy traffic and network congestion, packets are sometimes lost, corrupted, or arrive out of order. The result is an increased probability that data will be lost or that transmission speeds are decreased during periods of high traffic. If the TCP/IP protocol is being used, a request for retransmission of lost or corrupted packets is generated, further increasing congestion levels on the network. The integrity of media information (e.g., computer data) is jeopardized whenever 100% of the packets don=t arrive 100% intact. While some levels of voice packet or video packet transfer failures are acceptable large number of retransmits can seriously jeopardize packet integrity and result in complete data loss.

While a retransmission algorithm can be used to recover lost packets, the increased overhead of such algorithms places an extra burden on scarce network resources and increases network congestion levels while at the same time decreasing capacity, and increasing delay and jitter.

When an IP network is used as a transport mechanism, voice, video, and data is introduced at a specified subnet of the IP network even though multiple subnets are available for packet transport that would ensure proper routing of the data to its intended destination while at the same time decrease congestion levels at specific subnets. By default, however, many IP interfaces introduce data at a predetermined subnet regardless of traffic conditions.

Therefore, what is needed is a method and system for managing the transfer of voice, video, and other data types through an IP network that minimizes network congestion. A solution that allows a network to determine a best subnet route for carrying voice, data or video between a base station interface and any other node in a reconfigured IP network would provide numerous advantages.

SUMMARY OF THE INVENTION

The present invention provides a method and system of decreasing congestion levels in an IP network used as a data transport mechanism that utilizes entry subnets to achieve load leveling. A system control interface analyzes network congestion information based on traffic data gathered by an operations and maintenance node and other data gathering devices, and, based on the indicated congestion conditions, a preferred subnet is selected as a pathway for all or part of an existing data stream or as a pathway for a new data stream.

According to one embodiment, disclosed is a method of controlling traffic over multiple IP subnets. The method comprises the steps of gathering traffic data associated with the multiple IP subnets and analyzing the traffic data to determine which of the multiple IP subnets provides the most appropriate connection for transmitting a data stream between the base station interface node of the wireless network and other nodes, for achieving a desired traffic distribution over the multiple IP subnets. The other nodes may include a second base station interface node, a public network node, a gateway node to a different network, or any other similar node.

The method may include the steps of introducing a data stream from the base station interface node onto a first subnet, and then directing a new data stream (or redirecting an existing data stream) through a second subnet. The step of analysis may use statistical decision theory to analyze traffic data when selecting a preferred subnet. For example, one may use statistical theory to decide when a subnet is congested, before re-routing traffic to a different subnet. The data stream may include voice packets, video packets, or data packets.

A data stream may flow across more than two subnets of the IP network. Accordingly, a first data stream portion may be directed between the base station interface and the other node via a first subnet, and a second data stream portion may be directed between the base station interface and the other node via a second subnet, and so on.

The method of the present invention can be applied where a voice data stream initiated by a phone call over a wireless network consists of voice (or audio) packets introduced into the IP network from the base station interface node. It may also consist of traffic that is routed from an IP network to the base station interface for transmission over the air interface. Thus, several phone calls can be directed across a first subnet as a plurality of voice data streams. Then, some or all these voice data streams, or a voice data stream initiated by a new call, may be routed between the base station interface node and a second node through a second subnet.

In another embodiment, disclosed is a method of relieving IP network congestion in a data communications system. The system comprises an IP network for carrying traffic between a base station interface and a node within the IP network. The method comprises the steps of gathering data associated with a first subnet and a second subnet of the IP network and analyzing the data in order to select either the first subnet or the second subnet as a preferred subnet. Next, data traffic is directed between the base station interface and the second network node via the preferred subnet.

Also disclosed is a system for controlling traffic over multiple IP subnets (control system interface) of an IP network in a communications system comprising a wireless network and an IP network configured as a transport mechanism between the wireless network and other nodes connected to the IP network. In one embodiment, a PSTN interface is provided as a gateway between the IP network and the PSTN. The base station interface node functions as the gateway between the IP network and the wireless network. The control system comprises at least two subnets in communication with the base station interface, an operation and maintenance interface for gathering traffic data associated with the multiple IP subnets, and a system control interface for analyzing the traffic data to determine which of the multiple IP subnets provides the most appropriate connection for transmitting the data stream between the base station interface and the other network node for achieving a desired traffic distribution over the multiple IP subnets.

BRIEF DESCRIPTION OF THE DRAWINGS

Other aspects of the invention, including specific embodiments, are understood by reference to the following detailed description in conjunction with the appended drawings in which:

FIG. 5 is a process flow diagram illustrating a method of placing a new call on a communications system that is currently in use but is determined to be the optimal choice for receiving the new traffic; and FIG. 6 is a block flow diagram of a method of load leveling and reducing traffic congestion according to one embodiment of the invention.

Figure 1:
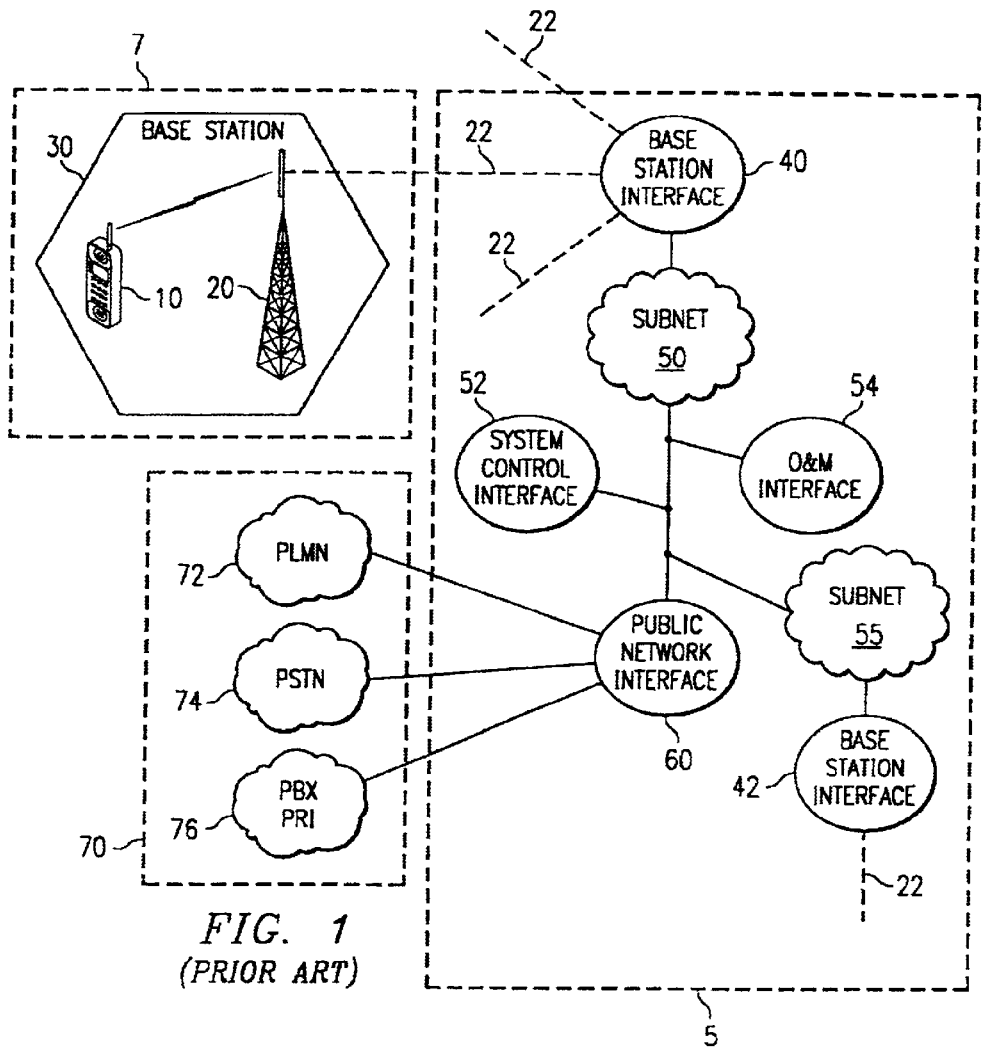
FIG. 1 shows a communications system that employs an IP network to send data packets between a public network and a wireless network.

References in the detailed description correspond to like references in the figures unless otherwise indicated.

DETAILED DESCRIPTION OF PREFERRED EMBODIMENTS

The present invention provides a method and system for-analyzing data traffic levels in an IP network to select an efficient signaling channel for the transport of data from a base station interface of a wireless network to subnets of the IP network. In particular, data collection devices, such as an operations and maintenance (O&M) function, gather network statistics, data, or other information relevant to IP network congestion levels (collectively, Atraffic data@). Based on an analysis of the traffic data, a system control interface selects a preferred subnet as a pathway for all or part of an existing data stream, or a new data stream. Since traffic may be directed across multiple subnets, the present invention can be used to relieve congestion in a congested subnet and to achieve load leveling (meaning that the percent of maximum capacity that is being used is approximately the same in each subnet; note that the maximum capacity of different subnets may vary) across multiple subnets. While the present invention is described particularly in terms of two subnets carrying voice data initiated by a phone call, it should be understood that the principles disclosed herein apply in other communication systems where multiple entry points into the system are available.

First, a brief overview of the Internet Protocol (IP) and conventional IP addressing schemes. IP is one of the protocols in the Transmission Control Protocol/Internet Protocol (TCP/IP) suite. The IP protocol provides a standard way for users to send and receive or route data traffic. IP can be used to route raw voice and video image data between nodes in the IP network. When necessary, the data is broken down into manageable units, called datagrams. The datagrams are transmitted within the IP network in standardized traffic units called packets. Packets are typically created by electronically attaching a packet identifier, known as a frame header, directly to the datagram. The frame header will generally contain information such as a source address of the packet, a destination address of the packet, and other information, such as a protocol number and a checksum, for example. In this manner, the IP protocol is used for routing each individual packet to a destination address.

IP addresses typically comprise a 32 bit address which may coded as a numeric identifier such as A128.12.5.155, for example. The address can be assigned to a component in a wireless network, such as a base transceiver station, mobile station or base station controller. For example, "128.12" can be used to identify the IP network where the mobile station is located, "0.5." can be associated with the subnet associated with the mobile station and "0.155" identifies the mobile station. Other IP addressing conventions for the mobile station can be used as well.

In this example, all datagrams destined for the mobile station will have a frame header comprising the destination address 128.12.5.155. Likewise, all datagrams generated at the mobile station 10 will have a frame header comprising an origination address of 128.12.5.10.

Having explained the IP protocol and its use to identify components in a wireless communications network, reference is made to FIG. 1 which illustrates a communications system utilizing an IP network 5 to send data including voice and video image data (collectively, Atraffic@) between a public network 70 and a wireless or mobile network 7. The wireless network 7 is shown to comprise a mobile station 10 within a geographic service area known as a cell 30. The mobile station 10 is in radio communication with a base station 20 which manages call activity from all mobile station devices within the cell 30. The mobile network 7 could be based on the Global System for Mobile Communications (GSM), the Advanced Mobile Phone System (AMPS), the Digital Advanced Mobile Phone System (D-AMPS), the Pacific Digital Cellular (PDC) network, or another similar wireless networking standard adopted for use in connection with Public Land Mobile Networks (PLMN), for example.

The base station interface 40 functions as a gateway to enable communication between the IP network 5 and the mobile network 7 by converting traffic received from the base station 20 (and perhaps partially processed by the base station 20) into a format compatible with the IP network 5. This means that the base station interface 40 breaks up the traffic into datagrams (if necessary), frames the datagrams to form packets, and directs the transmission of the packets through the IP network 5 via a subnet 50 to the public network interface (or gateway) 60. Similarly, the base station interface 40 may receive IP formatted traffic destined for the mobile station 10 through the subnet 50. In this situation, the base station interface 40 converts the traffic into a format compatible with the requirements of the mobile network 7. Typically, the base station interface 40 processes outgoing traffic from several base stations across one or more communication channels 22.

Depicted is one possible implementation of the prior art system utilizing an IP network 5 as a transport mechanism for traffic. In other possible implementations, there may be multiple subnets 50 and other possible connections from the subnet(s) 50 in addition to those illustrated.

The public network interface 60 functions as a gateway to public networks 70 such as Public Switched Telephone Network (PSTN) 72, Public Land Mobile Network (PLMN) 74, and Private Branch Exchange/Primary Rate Interface (PBX/PRI) 76, for example, so that a call may be routed into, or out of, the IP network 5. Accordingly, as traffic arrives from a public network 70 to the IP network 5, the public network interface 60 may break up the traffic into datagrams, frame the datagrams, and direct the routing of the packets through the IP network 5 to an appropriate base station interface. Likewise, the public network interface 60 processes traffic destined for a public network 70 from an IP format into an appropriate public network format. For example, the IP packetized data may be modulated with an analog carrier signal and transmitted along the facilities of the Public Switched Telephone network (PSTN) such as twisted pair copper wiring. Thus, the base station interface 40 and the public network interface 60 function similarly, but at opposite ends of the IP network 5.

A service provider or network manager may partition the IP network 5 into two or more subnets 50, 55. For example, the network manager may subdivide the IP network 5 into a first subnet 50 and a second subnet 55. The subnets 50, 55 could, for example, each service a different sector or geographical area within the service area of the IP network 5 and act as entry points to the IP network 5 for traffic in that sector or geographic area. As another example, the network manager could organize the IP network 5 by assigning a subnet to each base station interface 40. This system illustrated in FIG. 1 is configured with a first subnet 50 serving a first base station interface 40 and a second subnet 55 serving a second base station interface 52. The second base station interface 42 is connected via a communications channel 22 to a mobile network similar to the mobile network 7. It should be understood, however, that other configurations and organizations of subnets 50, 55 can be implemented.

In essence, the first subnet 50 acts as a transport mechanism between the public network interface 60, or other network interfaces, and the base station interface 40 associated with cell 30. Likewise, the second subnet 55 serves as a transport mechanism between the public (or other) network interface 60 and a second base station interface 42 associated with other cells (not shown).

Figure 2:
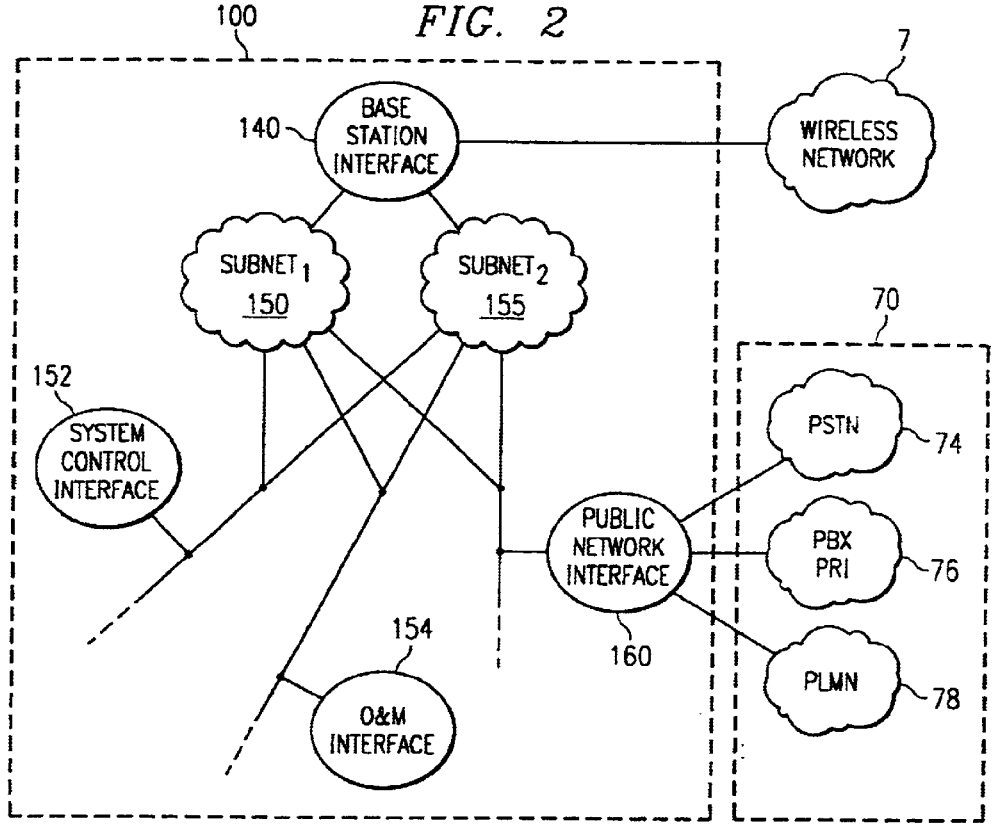
FIG. 2 is a communications system having an IP network with two subnets configured according to the teachings of the present invention.

To better understand the invention, reference is made to FIG. 2 which illustrates a communications system having an IP network 100 configured according to the teachings of the present invention. Accordingly, a base station interface 140 may use two or more subnets 150, 155 as entry points into the IP network 100. The IP network 100 is still configured for carrying traffic between the base station interface 140 and a public network interface 160, or other network interface. For example, both the first subnet 150 and the second subnet 155 are configured to transport traffic or "data streams" of traffic between a base station interface 140 and a public network interface 160. Thus, either, or both, of the first subnet 150 or the second subnet 155 may transport traffic between the base station interface 140 and the public network interface 160 or other network interface.

For example, the first subnet 150 could be utilized to route traffic between a public network interface 60 (or other network interface) and the base station interface 140. Likewise, the second subnet 155 could route traffic between a public network interface 60 and the base station interface 140. Accordingly, the subnets 150, 155 function as alternative conduits, or alternative communications channels within the IP network 100, for carrying traffic through the IP network 100. Stated another way, the IP network 100 can be described as a transport mechanism for routing traffic between a public network 70, or other network, and a wireless network 7 through a plurality of subnets 150, 155. Furthermore, though two subnets 150, 155 are shown in FIG. 2, an IP network according to the teachings of the present invention may incorporate any number of subnets. The use of multiple subnets provides the ability to direct traffic between a base station interface and a public network interface across multiple traffic channels in the IP network 100.

With reference to FIG. 2, therein is shown an operations and maintenance (O&M) interface 154 that monitors the IP network 100 performance by gathering traffic statistics on the IP network 100 and with respect to the individual subnets 150 and 155. The use of the O&M interface to gather traffic statistics is well known to those of ordinary skill. Once gathered, the O&M interface 154 can transmit such statistics to a system control interface 152 which, in part, manages the flow of traffic across the IP network 100 based on the current traffic conditions and statistics. The O&M interface 154 may also establish new connections, or place additional features on the IP network 100. Accordingly, the O&M interface 154 monitors the performance of the IP network 100 as a whole, and monitors the performance of the first subnet 150 and the second subnet 155 as well. In addition, the O&M interface 154 is adapted to process traffic statistics data to drive meaningful indicators relative to current traffic conditions.

The system control interface 152, comprises algorithms, such as those discussed below, for managing the flow of traffic across the IP network 100 based on current traffic statistics, and other information provided by the O&M interface 154, the base station interface 40, the public network interface 60, or other traffic analyzing devices. In addition, the system control interface 152 may control call placement and traffic routing within the IP network 100. In one embodiment, the system control interface 152 and the O&M interface 154 are combined into a single node of the IP network 100.

The system of FIG. 2 routes calls through multiple subnets based on current network congestion levels. While the following descriptions of methods for practicing the present invention are directed particularly to a digital phone call, wherein the voice signals are digitized and transported over using the resources of the IP network 100, those of ordinary skill in the art will recognize that the present invention may be configured for use with any other data types according to various embodiments. Furthermore, while the steps in FIGS. 3, 4, 5 and 6 are shown in a flow process format with sequential numbering, it will be apparent to those of ordinary skill in the art that several steps may be performed simultaneously and that some steps do not necessarily have to follow in sequence. When process ordering is essential to practicing the invention, such ordering will be noted herein.

Figure 3:
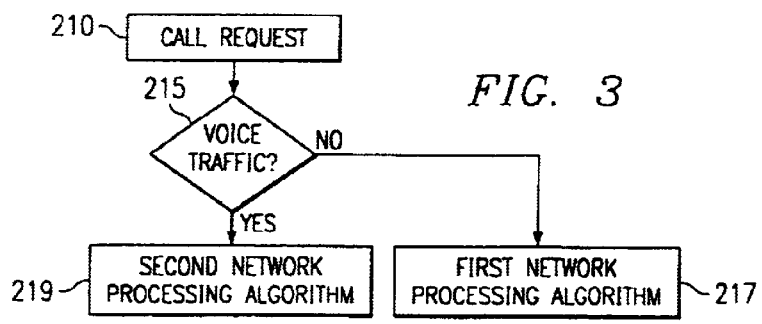
FIG. 3 illustrates an algorithm for determining whether an IP network carries traffic.

FIG. 3 is a process flow diagram illustrating an algorithm for determining whether an IP network is carrying voice traffic. The process begins when a call request (step 210) is made by the mobile station 10. For example, the mobile station 10 could notify the IP network 100, using standard IP signaling sequences, that it wishes to place a new call. Then, in a voice traffic query (step 215), the system control interface will detect whether there is voice traffic present on the IP network 100. If there is no traffic on the IP network 100, then the algorithm proceeds to a first network processing algorithm (step 217). If traffic is detected on the IP network 100, then the algorithm advances to a second network processing algorithm (step 219).

Figure 4:
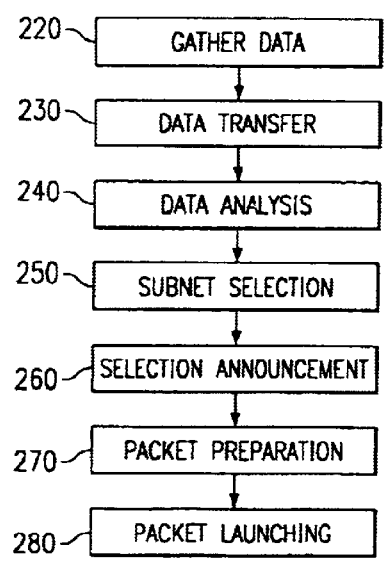
FIG. 4 is a process flow diagram illustrating a method of placing a new call on an IP subnet.

FIG. 4 is a process flow diagram of a method of placing a new call on the IP network 100 when it is not presently carrying traffic (the first network processing algorithm of step 217). The process begins after a call request (step 210) is received and it is determined (step 215), that the IP network 100 is not currently carrying traffic. Note that multiple data formats and types could be traversing the IP network 100 at this point. A Arandom@ choice of a subnet to carry the voice traffic might result in placing the voice traffic on a congested network. Accordingly, it is desired that the IP network 100 select a preferred subnet for carrying the new call.

As such, the method proceeds to gather traffic statistics relevant to current traffic conditions within the IP network 100 (step 220). The traffic statistical data is gathered by data gathering devices such as an O&M interface 154 and/or the base station interface 40 at other nodes of the IP network 100, according to various embodiments. Accordingly, the data gathering devices observe network traffic conditions (step 220) to obtain traffic data such as current network congestion levels, call failures, bit error rates, lost packet rate and other indicators of network congestion, for example. Step 220 may be implemented as an ongoing process in some IP networks, and may be simultaneously occurring with step 210 when a call request is made.

After traffic data is gathered, or statistics generated, the traffic data and/or statistics should be transferred to the system control interface 152 for analysis (step 230). In the event the O&M interface 152 and the system control interface 152 are implemented as a single function, the transfer of the statistical data (or statistics) from the traffic monitoring portion of the interface to the system control portion of the interface occurs within a single node of the IP network 100. Subsequently, the traffic data/statistics must be analyzed (step 240) by the system control interface 152.

The system control interface 152 maintains the algorithms or tables for selecting a subnet based upon predetermined criteria, and may incorporate such concepts as statistical analysis, or statistical decision theory, for example. A subnet is selected (step 250) with the system control interface 152 selecting a preferred subnet based on the predetermined criteria.

Following the selection of a preferred subnet (step 250), the system control interface 152 notifies the base station interface 40 which subnet is the preferred subnet in a subnet selection announcement (step 260). In response, the base station interface 40 prepares the traffic packets (step 270) wherein the base station interface 40 produces an appropriate frame header for properly routing a packet from the base station interface 40 to the public network interface 60 through the preferred subnet. Next, the base station interface 40, places the prepared packet onto the wireless telecommunications network 100 at the preferred subnet and launches the packets (step 280).

FIG. 5 is a process flow diagram of a method of placing a new call on an IP network 100 which is currently carrying voice data (the second network processing algorithm of step 219). A distinction is made where the IP network 100 is already carrying traffic from the situation where the IP network 100 is not currently carrying traffic since overhead is associated with the transmission of traffic over an IP network 100. Accordingly, an advantage of the present invention is the reduction of processing time by taking into account the transmission overhead associated with placing a traffic on the IP network 100 not currently carrying a traffic.

Specifically, the second processing algorithm begins after a call request is received (step 210) and it is determined that the IP network 100 is already carrying voice traffic (step 215). Referring to FIG. 5, the data gathering devices gather traffic data (step 220) and transfer that traffic data (step 230) to the system control interface 152. In a subnet is congested (as determined in step 232), the system control interface 152 checks the traffic data to determine whether the subnet that is carrying traffic is congested. If the subnet which is carrying voice traffic can handle additional traffic without a loss in quality, then the subnet currently carrying the traffic is used to carry additional traffic (step 234). However, if the subnet that is carrying voice traffic is congested or appears to be in danger of becoming congested, then the method proceeds to analyze the traffic data (step 240).

After analyzing the traffic data (step 240), a preferred subnet is selected (step 250) based on predetermined selection criteria and current traffic conditions on the IP network 100. Following the selection of a preferred subnet, the system control interface 152 informs the base station interface 40 of the selected subnet (step 260). The base station 40 next prepares the package that will carry the traffic by transmitting the packet(s) with the appropriate frame headers (step 270) and the base station interface 40 transmits the packet(s) on the wireless network 100 (step 280).

With reference to FIG. 6, therein is shown a process flow diagram of a method of load leveling and reducing traffic congestion levels in the network according to the invention. A traffic monitoring loop 200 is utilized for periodically analyzing traffic levels within the IP network 100. In this way, traffic levels can be balanced across all subnets of the IP network 100 by detecting congestion at the subnets 50 and 55 of the IP network 100. First, congestion levels at the subnets 50 and 55 are determined (step 202). The system control interface 152 monitor traffic levels at each subnet to determine if the IP network 100 can be better balanced.

If a subnet of the IP network 100 is congested, process flow is directed to determining step 220 as before. However, if congestion within the IP network 100 is not detected (step 202), the method proceeds to check whether a predetermined amount of time has passed (step 204). The time check can be selected by the system operator based on a number of factors such as the overhead involved with gathering and processing traffic statistical data, the number of subnets in the IP network 100, and a variety of other factors relevant to efficient allocation of network resources. If the predetermined amount of time has not yet passed, the method returns to step 202. Otherwise, if the predetermined amount of time has elapsed, the method proceeds to gather data in step 220.

When a new call is placed on an IP network 100, the data is gathered (step 220) by data gathering devices such as an O&M interface 154 and/or the base station interface 40, for example. Accordingly, the data gathering devices observe network traffic levels and statistical data to determine such factors such as network congestion levels, call failures, bit error rates, lost packet(s) rate and other indicators of network congestion.

After the statistical data is generated, it can be transferred (step 230) for analysis in determining a preferred subnet. Accordingly, the data gathering devices transmit the traffic statistical data to the system control interface 152 for analysis. Subsequently, the traffic statistical data is analyzed (step 240) by the system control interface 152 and a subnet is selected (step 250) based on the predetermined criteria. specified for the IP network 100.

The system control interface 152 may reassign existing traffic (step 250), to any of subnets outside the IP network 100. For example, the selection of a subnet (step 250) may include placing traffic on a preferred subnet, and all additional traffic (meaning data, or video) on other subnets outside the IP network 100. Likewise, the selection of subnet (step 250), may include the allocation of traffic to a subnet based on traffic data transfer rates, detected transfer rates at a destination public network, or other factors.

Following the allocation of traffic to subnets (step 250), the method proceeds to implement the selected network configuration by first announcing the subnet selection to the base station interface 40 (step 260). The base station interface 40 prepares the packets (step 270) by producing appropriate frame headers for properly routing a packet(s) from the base station interface 40 to the public network interface 60 or other network interface through the preferred subnet. Next, the base station interface 40 places the prepared packet(s) onto the wireless network 100 at the preferred subnet (step 280).

While the invention has been described in connection with preferred embodiments, it should be understood that modifications will become apparent to those of ordinary skill in the art and that such modifications are therefore to be included within the scope of the invention and the following claims.

What is claimed is:

1. A method of controlling signal traffic over multiple subnets of an IP network between a public network interface and a base station interface, comprising the steps of:

introducing a data stream including at least one voice packet, into the IP network further comprising the steps of:

directing the data stream through a first subnet; and directing the data first stream through the first subnet; and directing a second data stream through the second subnet;

utilizing an operation and maintenance interface to gather traffic data associated with the multiple subnets; and analyzing the traffic data utilizing statistical decision theory to select a preferred subnet in conjunction with a system control interface coupled to the operation and maintenance interface to determine which of the multiple subnets provides the most appropriate connection for transmitting the data first stream between the public network interface and the base station interface for achieving a desired amount of traffic distribution over the multiple subnets.

2. The method of claim 1 wherein the data stream comprises at least one video packet.

3. The method of claim 1 wherein the data stream comprises at least one data packet.

4. The method of claim 1 further comprising the steps of:

directing a first data stream portion between the base station Interface and the public network interface via the first subnet; and directing a second data stream portion between the base station Interface and the public network interface via a second subnet.

5. The method of claim 1 further comprising the steps of:

selecting one of the multiple subnets as the preferred subnet; and directing traffic between the base station interface and the public network interface via the preferred subnet.

6. The method of claim 1 wherein the data stream is initiated by a phone call directed across the first subnet.

7. The method of claim 6 further comprising the step of routing a new data stream initiated by a second phone call between the base station interface and the public network interface through the second subnet.

8. The method of claim 6 further comprising the step of redirecting a portion of the data stream through the second subnet.

9. The method of claim 1 wherein the step of redirecting routes each packet of the data stream individually.

10. A method of relieving Internet Protocol based network (IP network) congestion between a base station interface and a public network interface, comprising the steps of:

gathering data associated with a first subnet and a second subnet utilizing an operations and maintenance node;

analyzing the date in order to select either the first subnet or the second subnet as a preferred subnet;

introducing a data stream onto the first subnet and directing a remainder of the data stream onto the second subnet; and directing traffic between the base station interface and the public network interface via the preferred subnet.

11. The method of claim 10 further comprising the step of directing additional traffic between the base station interface and the public network interface via the preferred subnet.

12. The method of claim 10 further comprising directing existing traffic between the base station interface and the public network interface via the preferred subnet.

13. The method of claim 10 further comprising the steps of:

directing a first traffic portion between the base station interface and the public network interface via the first subnet; and directing a second traffic portion between the base station interface and the public network interface via the second subnet.

14. The method of claim 10 wherein the step of analyzing uses statistical decision theory to select either the first subnet or the second subnet as the preferred subnet.

15. A system for controlling signal traffic over multiple subnets, said system comprising:

at least two subnets;

an operation and maintenance interface coupled to said subnets for gathering traffic data associated with said at least two subnets of multiple subnets;

a base station interface coupled between a wireless network and said at least two subnets of said multiple subnets;

an IP network coupled between said at least two subnets of said multiple subnets and a public network; and a system control interface coupled to said operation and maintenance interface for analyzing the traffic data to determine which of said subnets provide the most appropriate connection for transmitting the traffic between the wireless network and the public network or other network for achieving a desired amount of traffic distribution over said subnets.

16. The system of claim 15 wherein the system control interface directs traffic comprising at least one data stream across at least two subnets to achieve load leveling.

* * * * *